Patented Oct. 5, 1943

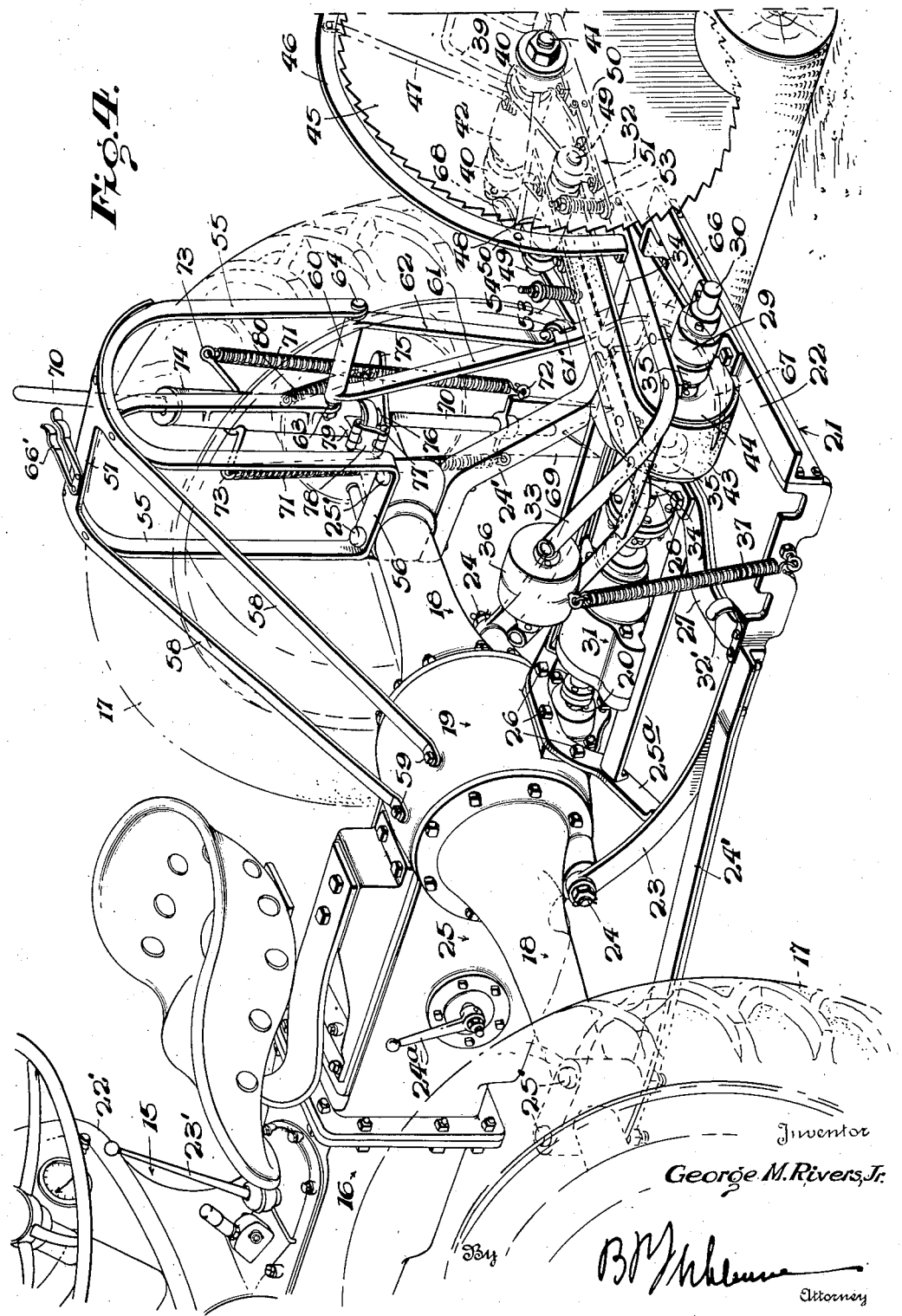

2,330,996

UNITED STATES PATENT OFFICE 2,330,996

PORTABLE SAWING MACHINE

George M. Rivers, Jr., Walterboro, S. C.

Application March 21, 1941, Serial No. 384,553

8 Claims. (Cl. 143—43)

My invention relates to a portable wood sawing machine.

An important object of the invention is to provide a machine of the above-mentioned character, which may be operated quickly, for sawing a log into sections of desired length.

A further object of the invention is to provide a machine of the above-mentioned character so constructed that the machine may be advanced to the next step longitudinally of the log, before the power driven saw has come to rest.

A further object of the invention is to provide means for holding the log in place during the sawing action, and to clear the free end portion of the log from the ground, so that there is no tendency for the work to pinch the saw.

A further object of the invention is to provide a machine of the above-mentioned character, which is in the nature of an attachment, to be applied to the modern tractor.

A further object of the invention is to provide a machine of the above-mentioned character, having the log holding unit and the sawing unit so constructed and arranged that both may be controlled in their operation by a single operator disposed upon one side of the tractor.

Other objects and advantages of the invention will be apparent during the course of the following description.

Figure 1:
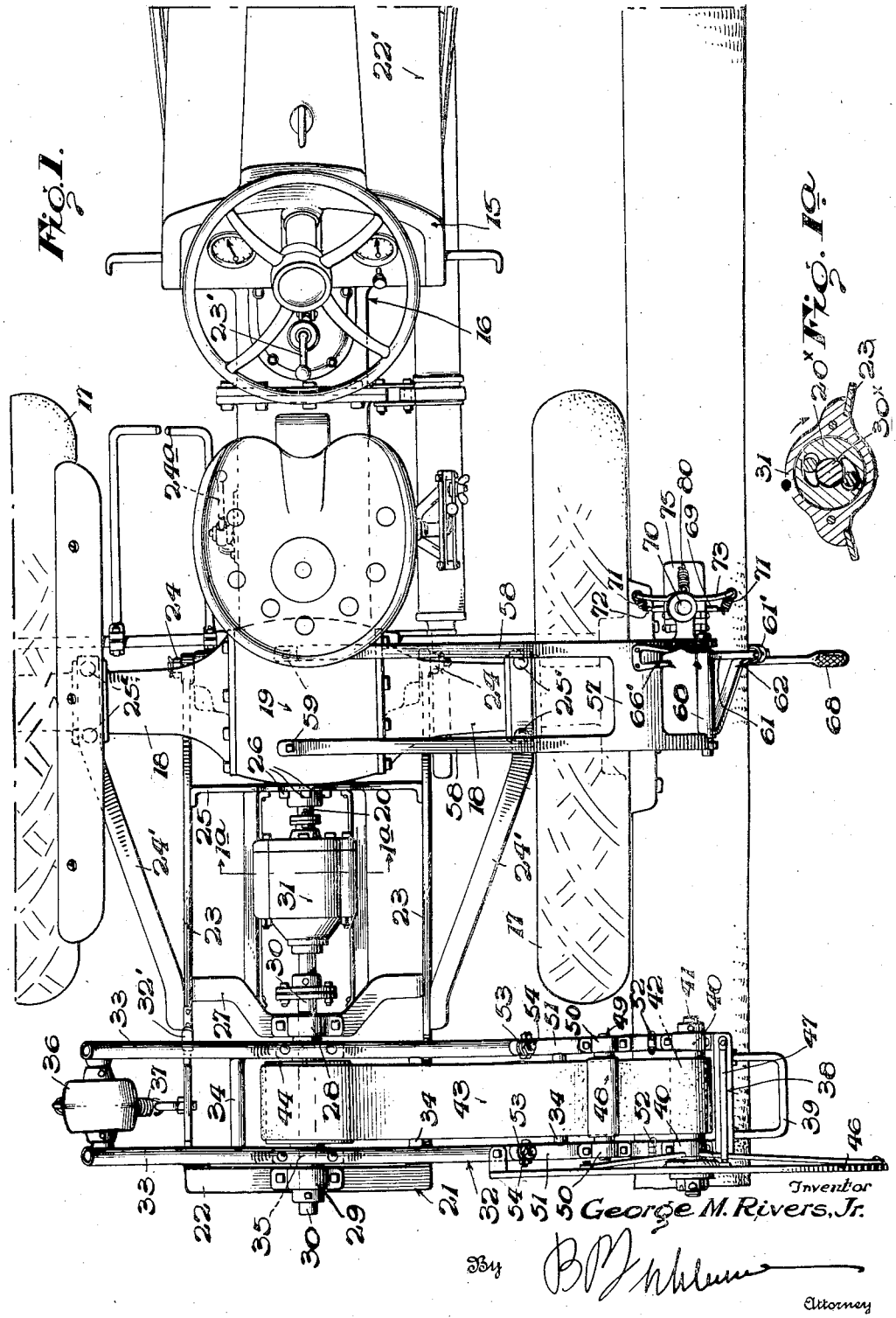
Figure 2:
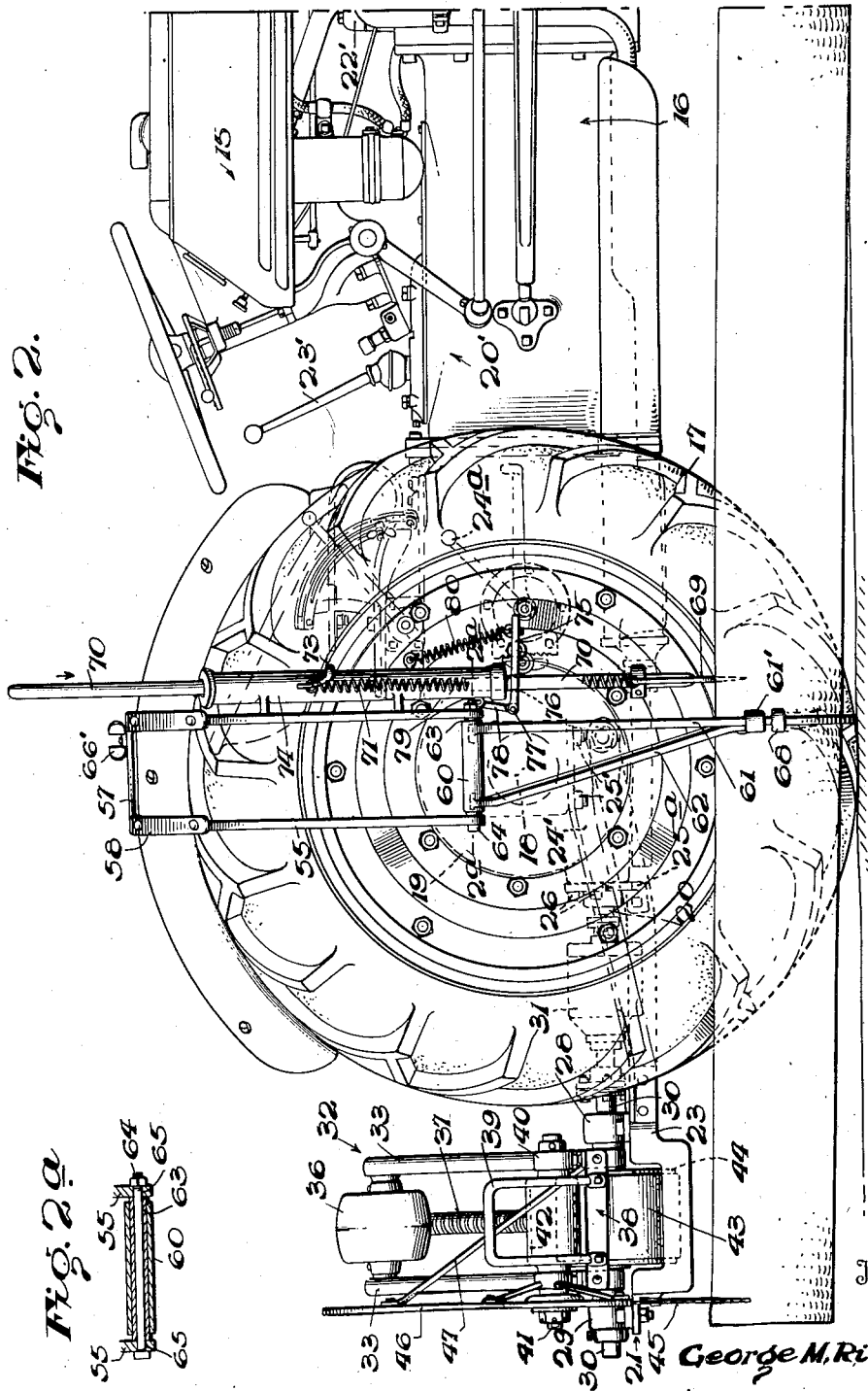
Figure 3:
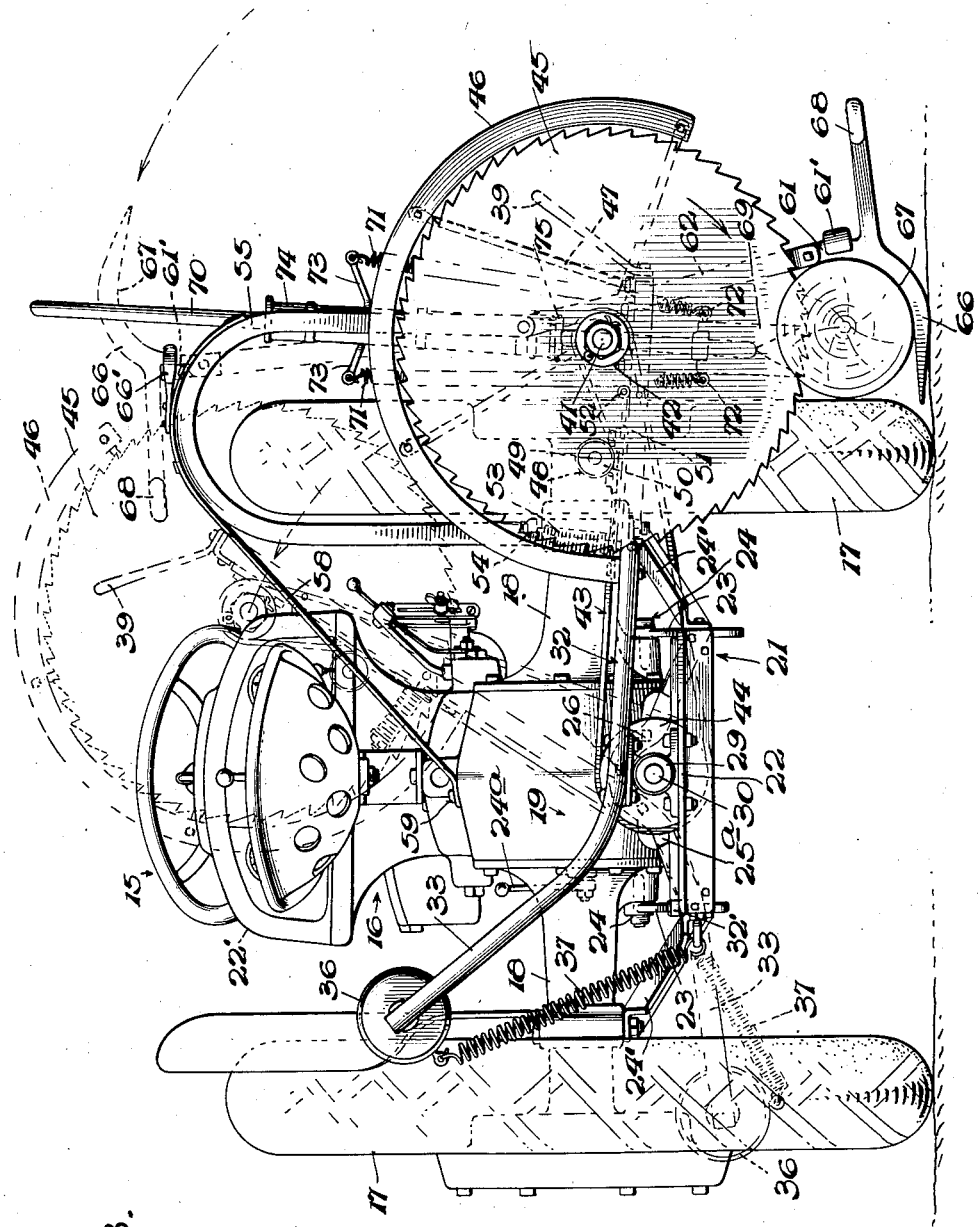

In the accompanying drawings forming a part of this application and in which like numerals are employed to designate like parts throughout the same, Figure 1 is a plan view of a portable sawing machine embodying my invention, Figure 1ª is a transverse section taken on line 1ª—1ª of Figure 1, Figure 2 is a side elevation of the same, Figure 2ª is a transverse section taken on line 2ª—2ª of Figure 2, Figure 3 is an end elevation of the machine, and, Figure 4 is a perspective view of the same.

In the drawings, wherein for the purpose of illustration is shown a preferred embodiment of my invention, the numeral 15 designates a tractor, such as a Ford tractor. This tractor may be any conventional tractor and the type of tractor shown is used simply for the purpose of illustration. The tractor comprises the usual chassis 16 supported by rear traction wheels 17. These traction wheels are mounted upon axle housings 18, rigidly attached to a differential housing 19. The numeral 20 designates a power take-off shaft, which is connected with the transmission gearing 20' of the tractor driven by the engine 22'. The tractor is provided with the usual gear shift lever 23' for controlling the action of the transmission gearing 20' and with a lever 24ª to connect and disconnect the power take-off shaft with and from the transmission gearing. The foregoing construction is that of the ordinary tractor, such as the Ford tractor.

My invention comprises an attaching frame 21, which is rectangular, and includes a transverse rear end 22, rigidly secured to longitudinal beams 23, which are bolted or otherwise rigidly attached to the differential housing 19, at 24. Diagonal braces 24' are provided, rigidly secured to the frame 21 near its rear end and to the axle housings 18 by bolts 25'. The frame further comprises a transverse bar 25ª, rigidly secured to the longitudinal beams 23 and this transverse bar has a part bolted or rigidly attached to the differential housing 19, as shown at 26, see Figure 4. The power take-off shaft 20 extends through an opening formed in this bar 25ª. The numeral 27 designates a rear transverse bar also rigidly attached to the longitudinal beams 23. A bearing 28 is rigidly mounted upon the transverse bar 27 and a bearing 29 is rigidly mounted upon the transverse bar 22 and these bearings receive a rotatable shaft 30. The shaft 30 is connected with the power take-off shaft 20 through the medium of an overrun clutch device 31 of any well known or preferred type. This overrun clutch device is so constructed that the clockwise turning movement of the power take-off shaft 20 will rotate the shaft 30 clockwise, as viewed from the rear of the machine, but the shaft 30 may rotate clockwise faster than the shaft 20 or may continue to rotate when the shaft 20 is at rest. The shaft 20 is connected with the part 20ˣ of the overrun clutch and the shaft 30 with the part 30ˣ, Figure 1ª.

The numeral 32 designates a vertically swinging saw carrying frame, which is generally L-shaped. This frame may be formed of spaced bars 33, connected by transverse bars 34. At the apexes of these bars the frame is provided with bearings 35, rigidly secured thereto, and these bearings are pivotally mounted upon the shaft 30. The saw carrying frame is arranged at the rear of the tractor and adjacent to the rear end of the frame 21, and extends transversely of the longitudinal travel of the tractor or machine. Mounted upon one end of the saw carrying frame is a weight 36, to balance the saw. A retractile coil spring 37 is attached to the weight 36 and to the beam 23, and the function of this spring is to automatically move the saw out of engagement with the log being cut, when the operator releases the end of the saw carrying frame adjacent to the saw. When the saw carrying frame is released, the spring 37 returns it to the raised position and a spring catch 32' then releasably holds the frame in this position. The opposite end of the saw carrying frame extends laterally beyond the frame 21 and the adjacent traction wheel. The bars 33 are secured together at their free ends by a transverse bar 38 and a U-shaped handle 39 is rigidly attached to the bar 38. Near the bar 38, the bars 33 have bearings 40 rigidly secured thereto, and these bearings rotatably hold a rotary arbor 41. Rigidly secured to the arbor 41 is a pulley 42, engaged by a belt 43 extending inwardly to engage a pulley 44, rigidly mounted upon the shaft 30. A rotary saw 45 is suitably mounted upon the arbor 41 and the upper portion of the saw is covered by a guard 46. This guard is stationary and is mounted upon one of the bars 33, and is connected with a diagonal brace 47, which may be secured to the transverse bar 38.

A belt tightener is provided, comprising a pulley 48, engaging the belt 43, and engaged by a shaft 49 journaled in bearings 50 mounted upon levers 51. These levers are pivotally mounted upon the bars 33 at 52, and the levers 51 are moved toward the bars 33 by springs 53, carried by rods 54, passing through openings in the levers 51 and pivotally attached to the bars 33.

Arranged upon the same side of the tractor with the handle 39 of the saw carrying frame is a log raising and holding device. This log raising and holding device comprises a stationary unit including a pair of rigid inverted U-shaped arms 55, extending over the adjacent traction wheel. These arms are connected at their inner ends by a transverse horizontal bar 56, which is rigidly clamped to the axle housing 18 by the bolts 25'. At their tops, the inverted U-shaped arms are rigidly connected by a horizontal strap 57, and diagonal brace straps 58 are rigidly attached to the strap 57 and their inner ends are bolted to the differential housing 19, as shown at 59. The log raising and holding device comprises a movable unit including a horizontal sleeve 60, having a vertically swinging arm 61 rigidly secured thereto. This arm is rigidly connected with a diagonal strap 62 which is also rigidly connected with the sleeve 60. An inner sleeve 63 pivotally receives the sleeve 60 thereon and the inner sleeve 63 is slightly longer than the sleeve 60 and the inner sleeve is arranged between the free ends of the arms 55 and the inner sleeve is connected with these arms by a pin or a bolt 64, passing through openings 65 (Figure 2a) in the arms 55 and through the sleeve 63. This effects a free pivotal connection between the arm 61 and the arms 55 so that the arm 61 is free to swing in a vertical plane, transversely of the longitudinal travel of the machine or tractor. The sleeve 63 also rigidly connects the arms 55, holding their ends spaced. The arm 61 is bent at its free end into a lateral extension or hook 66, and this extension tapers toward its free end, providing a vertically inclined face or wedge 67, thus affording an upward wedging action beneath the log, when the extension 66 is forced beneath the same. The numeral 68 designates a foot lever or treadle which is rigidly attached to the arm 61 near the lateral extension 66, and so positioned that it may be engaged with the foot to force the tapered extension 67 beneath the log. As clearly shown in Figure 3, the arm 61 is disposed outwardly of the traction wheel upon the same side of the machine with the handle 39 of the saw carrying frame, but the arm 61 is disposed forwardly of the saw carrying frame. The arm 61 carries a part 61' rigidly secured thereto, to engage with a spring latch 66', mounted upon the horizontal strap 57, to hold the arm in the raised position.

A dog device is provided to securely hold the log against turning movement when raised by the lateral extension 66. This dog device comprises a forked dog 69, rigidly mounted upon the lower end of a reciprocatory rod 70. The rod and dog are moved upwardly by retractile coil springs 71 attached at their lower ends to the dog, at 72, and at their upper ends to rods 73. These rods are rigidly mounted upon a vertical guide sleeve 74. This guide sleeve is arranged upon the outer side of the forward arm 55 and is welded or otherwise rigidly secured thereto. It is thus seen that when the rod 70 is released the springs 71 will return it to the raised position. Automatic means are provided to lock the rod 70 in the lowered position, comprising a latch plate 75, having an opening 76 through which the rod 70 passes. This latch plate is pivoted at 77 to a link 78, which is pivoted at 79 to the sleeve 74. The latch plate 75 is moved upwardly by a retractile coil spring 80, attached thereto and to the stationary guide sleeve 74. When the rod 70 is moved downwardly it will slide through the opening 76 but the spring 80 will cause the walls of the opening to clamp against the rod and hold it against upward movement. By slightly depressing the latch plate 75 the rod 70 will be released so that the springs 71 may return the same to the raised position.

The operation of the machine is as follows:

The tractor is driven to a position near and upon one side of the log so that the log raising and holding device and the free end of the saw carrying frame are next to the log. The usual hand lever of the transmission gearing is now brought to the neutral position so that the engine continues to run to drive the transmission gearing without effecting the longitudinal travel of the tractor, which is now stationary. The power take-off shaft 20 is now rotating and this rotation is transmitted through the medium of the overrun clutch device 31 to the shaft 30 which is rotating clockwise. The speed of the shaft 30 may be regulated by controlling the speed of the engine of the tractor, as is well known. The driver remains in the seat of the tractor because the log is cut quickly. The operator standing on the ground upon that side of the tractor adjacent to the free end of the saw carrying frame, first swings the arm 61 downwardly so that it assumes a position outwardly of and adjacent to the log. The operator then places his foot upon the element 68 and forces the tapered extension 66 beneath the log, producing a wedging action and raising the adjacent end of the log so that such end will be slightly spaced from the ground. This is important as there must be no upward pressure upon the free end of the log as it is being cut for this would tend to cause the work to pinch against the saw. The dog 69 is now forced downwardly into the log and this dog and lateral extension 66 securely hold the log against turning movement. The dog is locked in the lowered position by the latch plate 75, as explained. The log is arranged adjacent to the traction wheel or may contact therewith. If the log should be small in diameter, the inner tine of the dog will penetrate the same, while if it is larger in diameter, both tines will penetrate the same. With the log thus securely held, the operator grasps the handle 39 and swings the free end of the saw carrying frame downwardly toward the log and brings the rotary saw in contact with the log and properly moves the saw downwardly in a feeding action as the saw cuts the long transversely. As soon as the saw severs the log section from the log this log section will drop to the ground. The saw carrying frame is now released and automatically returns to the raised position and is held in this position. The saw is ordinarily driven from about 1,000 R. P. M. to 1,500 R. P. M., and when the log is severed the saw continues to rotate, due to inertia, although the speed of the engine is now reduced by the driver, preparatory to moving the tractor longitudinally to the next sawing position. The dog 72 is now released from the log by the manipulation of the latch plate 75 and moves upwardly to free the log and the arm 61 is swung upwardly to the raised position and is held in this raised position by the releasable spring latch 66'. The parts being thus adjusted, the driver manipulates the hand lever of the transmission gearing of the tractor, with the speed of the engine reduced, and ordinarily shifts into low gear to bring the tractor to the next sawing position. While the tractor is thus being shifted longitudinally of the log it is unnecessary to disconnect the take-off shaft 20 from the transmission gearing nor is it necessary to wait until the speed of the saw is reduced to the present speed of the engine, since the saw is free to rotate faster than the engine by virtue of the presence of the overrun clutch device 31. The cycle of operation is now repeated.

It is to be understood that the form of my invention herewith shown and described is to be taken as a preferred example of the same and that various changes in the shape, size, and arrangement of parts may be resorted to without departing from the spirit of my invention or the scope of the subjoined claims.

Having thus described my invention, what I claim is:

1. A portable log sawing machine, comprising a chassis, traction wheels to drive the chassis, an engine mounted upon the chassis, transmission gearing to drive the traction wheels from the engine, means to control the operation of the transmission gearing, a power take-off shaft driven by the transmission gearing, a vertically movable support mounted upon the chassis and having a free end to be arranged above the log and movable downwardly toward the log, said free end extending substantially to the outer side of the log remote from the chassis, a rotary saw mounted upon said free end of the vertically movable support, gearing for driving the rotary saw, an overrun clutch device connecting the power take-off shaft and the gearing, and means mounted upon the chassis and movable under the log and serving to raise the log so that pinching of the rotary saw is prevented, said raising means having a part extending substantially to the outer side of the log remote from the chassis, said free end and said part being disposed upon the same outer side of the log, the arrangement being such that the rotary saw may travel at a higher speed than the power take-off shaft so that the transmission may be employed to advance the machine relatively slowly to the next sawing position while the saw is still rotating faster than the power take-off shaft, the said part of the vertically movable support being adapted to be shifted upwardly to elevate the saw above the log so that the machine may be moved to the said next sawing position.

2. A portable log sawing machine, comprising a chassis, traction wheels to drive the chassis, an engine mounted upon the chassis, transmission gearing to drive the traction wheels from the engine, means to control the operation of the transmission gearing, a power take-off shaft driven by the transmission gearing, a vertically movable support mounted upon the chassis and having a free end to be arranged above the log, said free end extending substantially to the outer side of the log remote from the chassis, a rotary saw mounted upon said free end of the vertically movable support, gearing for driving the rotary saw, an overrun clutch device connecting the power take-off shaft and the gearing, means mounted upon the chassis independently of the vertically movable support and movable under the log and serving to raise the end portion of the log so that pinching of the rotary saw is prevented, said raising means having a part extending substantially to said outer side of the log with the free end, and a dog mounted upon the chassis and movable downwardly into engagement with the log to prevent the turning movement of the log, said dog being accessible to the operator standing upon said outer side of the log remote from the chassis, the arrangement being such that the saw may rotate faster than the power take-off shaft, and the said part of the support may be moved downwardly toward the log to feed the rotary saw during the cutting action and then be moved upwardly from the log to shift the saw to an elevation above the log so that the machine may be shifted to the next sawing position.

3. A portable log sawing machine, comprising a chassis, traction wheels to drive the chassis, an engine mounted upon the chassis, transmission gearing to drive the traction wheels from the engine, means to control the operation of the transmission gearing, a power take-off shaft driven by the transmission gearing, a vertically swinging support mounted upon the chassis and having its free end arranged above the log, a rotary saw mounted upon the free end of the support, gearing for driving the rotary saw, an overrun clutch device connecting the power take-off shaft and the gearing, means mounted upon the chassis and positioned upon the outer side of the log remote from the chassis and movable beneath the log in an inward direction toward the chassis to raise the end portion of the log so that pinching of the rotary saw is prevented, and a dog mounted upon the chassis and movable into engagement with the log to prevent turning movement of the log.

4. A portable log sawing machine, comprising a chassis, traction wheels for the chassis, means to drive the traction wheels, a vertically swinging support mounted upon the chassis and having its free end arranged above the log, a rotary saw mounted upon the free end of the support, means mounted upon the chassis and positioned upon the outer side of the log remote from the chassis and movable beneath the log in an inward direction toward the chassis and serving to raise the end of the log to prevent the pinching of the rotary saw, and a dog mounted upon the chassis and movable into engagement with the log to prevent its turning movement.

5. A portable log sawing machine, comprising a chassis, traction wheels for the chassis, means to drive the traction wheels, a vertically swinging support mounted upon the chassis and having its free end arranged above the log, a rotary saw mounted upon the free end of the support, means to drive the rotary saw, supporting means mounted upon the chassis, a lever pivotally mounted upon the supporting means and arranged upon the outer side of the log remote from the chassis and having a lateral extension facing inwardly toward the chassis, the lateral extension having an upper inclined face extending upwardly in an outward direction from the chassis, the lateral extension being moved beneath the log by an inward movement toward the chassis and then serving to raise the log, and a dog to hold the log against turning movement.

6. A portable log sawing machine, comprising a chassis, traction wheels for the chassis, means to drive the traction wheels, a vertically swinging support mounted upon the chassis and having its free end arranged above the log, a rotary saw mounted upon the free end of the support, means to drive the rotary saw, and a lever mounted upon the chassis and arranged upon the outer side of the log remote from the chassis and having a lateral extension facing inwardly toward the chassis, the lateral extension having an upper inclined face extending upwardly in an outward direction from the chassis, the lateral extension being moved beneath the log by an inward movement toward the chassis and then serving to raise the log.

7. An attachment to be applied to a power driven vehicle having a power take-off shaft, a vertically swinging support extending transversely of the path of travel of the vehicle and having its free end arranged above a log to be cut, means to mount the support upon the vehicle, the rotary saw mounted upon the free end of the support, means driven by the power take-off shaft to rotate the saw, a lever arranged upon the outer side of the log remote from the chassis and having an inwardly projecting lateral extension to be passed beneath the log, said lateral extension having a vertically inclined face extending upwardly in an outward direction from the chassis so that the log is raised when the lateral extension is moved under the log, and means to mount the lever upon the vehicle.

8. A log sawing attachment to be applied to a power driven vehicle having a chassis and a power take-off shaft, a vertically swinging support extending transversely of the path of travel of the vehicle and having its free end arranged above the log, means to mount the support upon the chassis, a rotary saw mounted upon the free end of the support, means driven by the power take-off shaft to rotate the saw, a lever arranged upon the outer side of the log remote from the chassis and having an inwardly projecting lateral extension to be passed beneath the log, said lateral extension having a vertically inclined face extending upwardly in an outward direction from the chassis, the lateral extension serving to raise the log when it is moved beneath the log by an inward movement toward the chassis, and means to prevent rotation of the log.

GEORGE M. RIVERS, Jr.